(12) United States Patent
Lepage

(10) Patent No.: US 7,544,405 B2
(45) Date of Patent: Jun. 9, 2009

(54) PACKAGING SHAPED ARTICLES, E.G., OPAQUE BOTTLES, AND PROCESS FOR THE MANUFACTURE THEREOF

(75) Inventor: Jean-Luc Lepage, Francheville (FR)

(73) Assignee: Tergal Industries, Gauchy (FR)

( * ) Notice: Subject to any disclaimer, the term of this patent is extended or adjusted under 35 U.S.C. 154(b) by 67 days.

(21) Appl. No.: 11/580,885

(22) Filed: Oct. 16, 2006

(65) Prior Publication Data

US 2007/0063394 A1 Mar. 22, 2007

Related U.S. Application Data

(63) Continuation of application No. PCT/FR2005/000900, filed on Apr. 14, 2005.

(51) Int. Cl.
*B29D 22/00* (2006.01)
*B29C 45/00* (2006.01)
*B29C 47/00* (2006.01)
*B29C 49/00* (2006.01)

(52) U.S. Cl. .................... 428/35.7; 428/34.1; 428/34.4; 428/34.5; 428/36.4; 428/36.6; 428/36.92; 264/500

(58) Field of Classification Search ................ 428/34.1, 428/34.4, 34.5, 34.6, 34.7, 35.7, 36.4, 36.6, 428/36.7, 36.92; 264/500
See application file for complete search history.

(56) References Cited

U.S. PATENT DOCUMENTS

| 3,784,661 | A | | 1/1974 | Schaul et al. |
| 4,051,265 | A | | 9/1977 | Kirshenbaum et al. |
| 4,594,211 | A | | 6/1986 | Mohnhaupt |
| 5,532,047 | A | | 7/1996 | Okazaki et al. |
| 5,932,338 | A | | 8/1999 | Schnabele et al. |
| 6,060,137 | A | * | 5/2000 | Akao ..................... 428/35.2 |
| 7,045,200 | B2 | | 5/2006 | Mursehall et al. |
| 2004/0195141 | A1 | | 10/2004 | Adriansens et al. |

FOREIGN PATENT DOCUMENTS

| DE | 100 43 576 | 9/2000 |
| EP | 0475110 B1 | 3/1992 |
| EP | 0 933 199 | 8/1999 |
| EP | 1 541 623 A1 | 6/2005 |
| FR | 1 591 905 | 6/1970 |
| GB | 2 086 342 A | 5/1982 |
| JP | 60193630 | 10/1985 |
| JP | 04-114057 | 4/1992 |
| JP | 04-173134 | 6/1992 |
| JP | 11254622 | 9/1999 |
| JP | 2003301094 | 10/2003 |
| KR | 1019900006335 B1 | 8/1990 |
| WO | WO 94/10229 | 5/1994 |
| WO | WO 95/03217 A1 | 2/1995 |
| WO | WO 01/32514 | 5/2001 |
| WO | WO 01/55261 | 8/2001 |
| WO | WO 02/30994 A1 | 4/2002 |
| WO | WO 03/064267 | 8/2003 |

OTHER PUBLICATIONS

FR 1 591 905 cited in International Search Report—p. 34 of 68-page document filed Oct. 16, 2006.

* cited by examiner

*Primary Examiner*—Rena L Dye
*Assistant Examiner*—Walter B Aughenbaugh
(74) *Attorney, Agent, or Firm*—Buchanan, Ingersoll & Rooney P.C.

(57) ABSTRACT

Packaging/storage shaped articles, for example, opaque bottles suited for storing and shielding such products as milk away from the adverse effects of visible and UV radiation, are manufactured by first providing/formulating precursor compositions which include a polyester or polylactone thermoplastic matrix having at least one mineral filler distributed therethrough, the mineral filler containing a titanium oxide and/or zinc sulfide and also having from 2% to 40% by weight of the composition, and thence converting the composition into such packaging/storage shaped article, notably by injection-blow molding.

22 Claims, No Drawings

PACKAGING SHAPED ARTICLES, E.G., OPAQUE BOTTLES, AND PROCESS FOR THE MANUFACTURE THEREOF

CROSS-REFERENCE TO PRIORITY/PCT APPLICATIONS

This application claims priority under 35 U.S.C. § 119 of FR 04/03928, filed Apr. 15, 2004, and is a continuation of PCT/FR 2005/000900, filed Apr. 14, 2005 and designating the United States (published in the French language on Nov. 3, 2005 as WO 2005/102864 A1; the title and abstract were also published in English), each hereby expressly incorporated by reference and each assigned to the assignee hereof.

BACKGROUND OF THE INVENTION

1. Technical Field of the Invention

The present invention relates to shaped articles, especially opaque packaging shaped articles such as bottles, allowing certain products, such as milk, to be stored away from visible and UV radiation.

This invention relates more particularly to opaque bottles obtained by the injection-blow molding of a polyester-based composition and to a process for manufacturing the packaging articles, especially bottles.

2. Description of Background and/or Related and/or Prior Art

Bottles made of thermoplastics, and more particularly polyester such as polyethylene terephthalate, are being increasingly used for the storage of diverse and varied liquids, especially liquid food products such as water, beer, and still or fizzy sugared drinks, generally called carbonated drinks. They are also used for the storage of milk and other solid or liquid food substances.

However, milk may come in various forms, depending on the treatment process applied, allowing it to be preserved for relatively short or relatively long periods. Thus, sterilized fresh milk must be used very soon after being bottled, whereas UHT (ultra-high temperature) milk can be preserved for several months after being bottled.

This very long preservation time imposes constraints on the storage container, such as bottle or carton.

This is because the taste of milk changes through the effect of UV and/or visible radiation. A milk having its taste impaired by this effect is termed as having a "light-affected taste".

This change is especially due to the degradation of vitamin B2 (riboflavin) in milk as a result of being exposed to light. The degradation of this vitamin in milk varies according to the intensity of the light source, to the exposure time and also to the wavelength range of the light source.

Radiation with wavelengths from 350 to 520 nm appear to be responsible for the degradation of this vitamin and therefore for the impairment in the taste of the milk.

Consequently, storage containers or the packaging for these containers must have a very low or zero light transmission for radiation with wavelengths of shorter than 550 nm, and more generally for UV radiation, and visible radiation. This specification is increasingly important as the storage time of the milk is extended.

This constraint is very important for long-life milk, such as UHT (ultra-high temperature treatment) milk, and also for certain types of vitaminized milk that is sensitive to radiation and for derived dairy products, such as yogurt, cream or the like.

Solutions for the production of containers compatible with the long storage time of milk have already been proposed and are widely used.

One of the containers most used is a carton made of multilayer cardboard for ensuring low light transmission for the UV and visible wavelength ranges.

However, the closure systems of these cartons, especially after a first use, are not practical and do not guarantee effective closure.

To remedy the drawbacks of these cartons, such as stiffness, dead space, shape, size and handleability, it has been proposed to use bottles, especially bottles made of high-density polyethylene (HDPE).

However, to obtain a low light transmission level these bottles are formed by multilayer walls that may comprise three to six layers produced in different ways.

The external layers generally contain a white pigment, consisting of titanium oxide, in order to give an attractive appearance compatible with the product stored.

As an intermediate layer, there is a layer with a low light transmission. This layer generally includes a carbon black as light-absorbent filler. Finally, an oxygen barrier layer may also be present, and also adhesive layers in order to give the structure good stability.

These bottles require complex manufacturing processes. Furthermore, their recovery and recycleability are difficult to implement owing to the presence of several different materials.

SUMMARY OF THE INVENTION

The present invention avoids or ameliorates the above drawbacks via a novel process for the manufacture of containers or shaped articles, especially packaging shaped articles, which have a very low light transmission especially in the wavelength range from 350 to 550 nm, and more generally for UV radiation and visible radiation. Such shaped articles may be manufactured by simple processes, already in use for the manufacture of conventional containers, and may also have the advantage of being able to be easily recycled for the same use, as they are obtained from a single material and recycling them does not degrade the intrinsic properties of the material.

Thus, the present invention features a process for manufacturing novel shaped articles, especially for packaging of products such as food products, by formulating a composition comprising a polyester or polylactone thermoplastic and at least one opacifying filler that is a white mineral filler selected from the group consisting of titanium oxides and zinc sulfide, with a weight concentration of from 2% to 40%, preferably from 4% to 20%, relative to the total weight of the composition and thence shaping said composition.

DETAILED DESCRIPTION OF BEST MODE AND SPECIFIC/PREFERRED EMBODIMENTS OF THE INVENTION

The term "packaging shaped articles" means flexible films obtained by extrusion, cartons or containers obtained by injection molding, and more particularly hollow bodies such as bottles obtained by injection-blow molding.

According to the present invention, the shaped articles are formed by a single layer obtained from a composition as defined above.

According to a preferred embodiment, the articles obtained according to the process of the invention have a light transmission factor of less than 0.25% for wavelengths of from 350 nm to 550 nm, especially from 400 nm to 550 nm, and preferably less than 0.1% in this wavelength range.

The term "light transmission factor" means the ratio of the light intensity of the radiation emanating from the wall to the light intensity of the incident radiation applied to the wall. The measurement of these intensities is carried out on the radiation in a direction perpendicular to the surface of the wall. Thus, the measured transmission in the present invention is called "the normal transmission" or "normal transmission factor".

This transmission factor depends on the nature of the filler, the concentration of the filler and the wall thickness of the article.

Thus, the articles obtained by the process of the invention have a normal transmission factor of less than 0.25% for wall thicknesses of from 0.2 to 0.6 mm. Advantageously, the normal transmission factor is less than 0.20% and preferably less than 0.1%.

According to the invention, the mineral filler is a white pigment, such as titanium oxides in the rutile and/or anatase form. These titanium oxides are in the form of particles of various sizes, advantageously from 0.2 µm to 1 µm.

These particles may be particles of pure titanium oxide or may comprise a titanium oxide core with a protective coating. This protective coating, which may be formed by one or more layers of oxides of various metals and/or of organic compounds, makes it possible to reduce or even eliminate any interaction from the titanium oxide and the polymer forming the matrix of the composition. This is because the suitable fillers for the invention must exhibit properties and characteristics that eliminate or avoid any action that might impair the process for manufacturing the polyester or its properties.

According to the invention, another mineral filler forming a white pigment, namely zinc sulfide, allows suitable compositions to be obtained for the manufacture of articles, especially packaging shaped articles exhibiting suitable light opacification for a filler concentration compatible with the processes for forming the composition and its manufacture.

According to another embodiment, the processes for forming the compositions according to the invention are processes conventionally used for the forming of polyesters and the production of articles of various shapes and sizes.

The articles obtained according to the process of the invention may be films, molded parts, extruded profiles or hollow bodies manufactured by the use of conventional processes, such as injection molding, extrusion, pultrusion or injection-blow molding.

The injection-blow molding processes employed for the manufacture of polyester bottles used especially for storing water or carbonated drinks are suitable for the production of bottles from a composition according to the invention, which contains a mineral filler. The settings for the injection and blowing conditions are standard for those skilled in the art and similar to those needed to adapt the injection-blow molding process to a conventional polyester.

The articles, especially bottles, obtained are formed by a single layer of material and have a suitable attractive appearance, especially for storing milk or dairy products.

The very low light transmission properties of the walls of the bottle allow such a bottle to be used for storing milk or dairy products for a very long period, of several months, without seeing any impairment in the taste of the milk. Consequently, this bottle is suitable for bottling long-life milk or light-sensitive milk such as UHT milk, vitaminized milk or other light-sensitive products.

Moreover, by using a plastic such as a polyester or a polylactone it is possible to obtain packaging articles, especially bottles, that exhibit good mechanical properties and can be easily recycled.

In general, the articles obtained according to the process of the invention, that is to say with a polyester or polylactone composition containing a mineral filler selected from titanium oxides or zinc sulfide, are particularly suitable for the storage of light-sensitive products.

Furthermore, these articles exhibit better aging resistance as the mineral filler, by reflecting most of the light rays and by absorbing the UV rays, protects the polyester, especially in the core of the wall and on the unexposed surface, from the effect of light radiation. This effect is particularly important in the case of thick articles such as, for example, extruded profiles.

According to the invention, the term "polyester" means a polyester resin selected from polyethylene terephthalate, polyethylene naphthalate, polyethylene terephthalate copolymers and polyethylene naphthalate copolymers, which may contain at least one crystallization retarding compound or recurring structural units.

Hereinafter, the term "polyethylene terephthalate or PET" will be used. However, the characteristics, processes or uses described in respect of this polymer also applies to polyethylene naphthalate.

In a preferred embodiment of the invention, the polyester resin is obtained from ethylene glycol and terephthalic acid or its esters. These resins are often denoted by the acronym PET.

The term "PET or polyester resin" is both a homopolymer, obtained solely from terephthalic acid monomers or its esters, such as dimethylterephthalate and ethylene glycol, and copolymers comprising at least 92.5% by number of ethylene terephthalate repeat units. Such polymers are the preferred polymers of the invention.

The polyester may also include at least one crystallization retarder making it possible, especially during the cooling of the molded or injection-molded article such as a preform, to slow down or retard the crystallization of the polyester so as in this way to crystallize it as very small crystals, preventing spherulitic crystallization, and so as to be able to manufacture an article with acceptable mechanical properties. Such properties may be beneficial in certain applications.

These crystallization retarders are difunctional compounds, such as diacids and/or diols, that are added to the monomer mixture before or during polymerization of the polyester.

As crystallization retarder or retardant, representative are: diacids, isophthalic acid, naphthalenedicarboxylic acid, cyclohexanedicarboxylic acid, cyclohexanediacetic acid, succinic acid, glutaric acid, adipic acid, azelaic acid, and sebacic acid; and as examples of diols, mention may be made of aliphatic diols comprising 3 to 20 carbon atoms, cycloaliphatic diols having 6 to 20 carbon atoms, aromatic diols comprising 6 to 14 carbon atoms and mixtures thereof, such as diethylene glycol, triethylene glycol, isomers of 1,4-cyclohexanedimethanol, 1,3-propanediol, 1,4-butanediol, 1,5-pentanediol, (2,4)-3-methylpentanediol, (1,4),2-methylpentanediol, (1,3)2,2,4-trimethylpentanediol, (1,3)-2-ethylhexanediol, (1,3)-2,2-diethylpropanediol, 1,3-hexanediol, 1,4-di(hydroxyethoxy)benzene, 2,2-bis(4-hydroxycyclohexyl)propane, 2,4- dihydroxy-1,1,3,3-tetramethylcyclobutane, 2,2-bis(3-hydroxyethoxyphenyl)propane, 2,2-bis(4-hydroxypropoxyphenyl)propane and mixtures thereof.

Diethylene glycol is often inherently present in polyesters as it forms during the synthesis by the condensation of two ethylene glycol molecules. Depending on the desired concentration of repeat units comprising a diethylene glycol (DEG) residue in the final polyester, either the diethylene glycol is added to the monomer mixtures or the polyester synthesis conditions are controlled in order to limit the formation of diethylene glycol.

Advantageously, the molar concentration of diethylene glycol in the polyester relative to the number of moles of diacid monomers is less than 3.5 mol %, preferably less than 2 mol %.

The polyester resins used for the invention have a viscosity index VI that may lie within a very broad range, advantageously from 0.5 dl/g to 1.2 dl/g, preferably from 0.6 dl/g to 1 dl/g.

The viscosity index VI is measured on a polymer solution containing 0.5 g of polymer in 100 ml of a solvent consisting of orthodichlorobenzene/phenol (50/50 by weight) at 25° C., according to the ISO 1628/5 standard of Jun. 15, 1986. The polymer solution is obtained by taking into account the weight of the filler, in order to obtain a concentration of 0.5 g of polymer, filler deducted.

The viscosity index is generally determined by analyzing the polymer granules obtained at the end of manufacture of the polymer.

When the thermoplastic compositions of the invention are used to produce hollow bodies or bottles, this viscosity index VI may be measured on the polymer constituting the walls of the bottle.

To carry out this measurement, a portion of the bottle is cut off and then cut up into small pieces in order to allow them to be dissolved.

In general, the viscosity index of the polyester is hardly affected during the process of manufacturing the hollow body. However, the viscosity index measured on the wall of the bottle may be less than or greater than that measured on the feed granules in the injection molding step. The value measured on the granules is generally close to that determined on the bottle.

These considerations are also applicable as regards the viscosity index measured on the polyester forming the walls of the preform obtained after the injection molding step.

The thermoplastic compositions of the invention may contain other components, such as dyes, brighteners, light and heat stabilizers, antioxidants and acetaldehyde traps, for example. This list is given merely by way of example and is not exhaustive.

According to the invention, the composition is manufactured using the conventional processes for manufacturing polyesters. In a preferred embodiment, the mineral filler or white pigment is added at the start of polymerization, into the mixture containing the monomers, as will be described below.

The process of the invention can also be carried out by using as starting material, a composition obtained by recycling articles, for example bottles made of a similar composition. Thus, collected bottles are ground into particles. These particles may be treated, for example washed and granulated, before feeding in a process of producing bottles by injection molding and blowing, according to the invention.

The process for manufacturing the thermoplastic compositions of the invention comprises a first step of esterification or transesterification in the presence or absence of a catalyst. The hydrolysate or the esterified product obtained is then polycondensed under reduced pressure in the presence of catalysts, such as, for example, antimony, titanium or germanium compounds. In this step, alcohol or water is removed in order to allow the polycondensation reaction to progress.

According to the invention, this polycondensation is stopped when the degree of polycondensation or the viscosity index has reached the desired value.

The polyester obtained is made to flow through dies for obtaining rods that are then converted into granules for cutting.

These granules may undergo a heat treatment, either to increase the viscosity of the polymer (a SSP or solid-state postcondensation heat treatment) or to reduce the acetaldehyde content (drying and evaporation at a temperature below that of an SSP treatment).

According to another embodiment of the invention, to limit the degree of polycondensation during the heat treatment described above in order to lower the acetaldehyde content, the polyester may include a monofunctional monomer, preferably a monoacid. The molar content of monofunctional monomer is from 0.5 to 3 mol % relative to the total content of diacid monomers.

The monoacids suitable for the invention are, for example, benzoic acid, naphthalenic acid, aliphatic acids having a boiling point compatible with the polyester synthesis process, that is to say, advantageously, at least above that of ethylene glycol or their esters or monoalcohols such as cyclohexanol or aliphtatic alcohols, also advantageously having a boiling point above that of ethylene glycol.

Various additives, such as brighteners, dyes or other additives, light or heat stabilizers or antioxidants for example, may be added to the polyesters of the invention either at the polymerization step or into the molten polymer before injection molding.

According to a preferred embodiment, the mineral filler or white pigment is advantageously suspended in a monomer of the polyester to be manufactured. As preferred monomer for producing this suspension, mention may be made of the diols used in the manufacture of the polyester, such as ethylene glycol. Moreover, the dispersion of the mineral filler in the composition is better when the dispersion in the monomer before the addition is homogeneous and when the filler is dispersed in the form of very small particles containing no coarse agglomerates. These dispersions may be produced with any of the known means, such as conventional mechanical stirrers, ultrasonic devices and high-power mixing devices, such as homogenizers of the Ultra-Turrax type.

The white pigment suspension is advantageously added to the reaction mixture at the esterification or transesterification step.

The white pigment concentration in the ethylene glycol is such that the amount of ethylene glycol used for this step may represent from 20% to 100% of the total ethylene glycol needed to synthesis the polymer.

Additives may be used in order to make it easier to make this suspension.

However, the pigment may be added directly to the reaction mixture, at the various polymerization, esterification and polycondensation steps, in the form of powder, without thereby departing from the scope of the invention.

The pigment may also be incorporated, in the form of powder or a masterbatch or concentrated solutions, into the polymer after it has been synthesized, directly before granulation of the polymer, or by mixing it with the polyester granules before they are melted in order to feed the forming processes, such as the injection-molding or extrusion processes. This pigment may also be added directly into the molten polymer before being fed into the above forming processes.

The use of a masterbatch with a high concentration of mineral filler, for example greater than 30% by weight, is one of the preferred methods of implementing the invention. The masterbatch advantageously comprises a polymeric matrix, also made of polyester. It is obtained in the form of granules and can be manufactured using the polymerization process described above, or the mineral filler powder is added into the polyester melt.

Advantageously, the masterbatch granules are mixed with the polyester granules before introduction into the forming devices, especially the means for melting the composition, or they are metered into the flow of polyester granules at the inlet of the forming devices. The masterbatch granules may also be added directly into the polyester melt.

One of the particular and important applications of these compositions, and it is this that constitutes a preferred embodiment of the present invention, is the manufacture of hollow bodies such as bottles by the injection-blow molding technique or of articles obtained by injection molding.

In these applications, the thermoplastic compositions according to the invention are produced in the form of granules of various sizes, or are formed in situ in the feed and melting devices of the forming means, based on a polyester resin containing no mineral filler, with addition, either in the solid state or by feeding into the already molten resin, of the mineral filler in the form of powder or masterbatch, as described above.

The composition—polyester resin and/or masterbatch—granules are advantageously dried in order to obtain a moisture content of less than 50 ppm, preferably less than 20 ppm. This drying step is unnecessary if the moisture content of the polyester is sufficiently low. In some cases, it may be advantageous to dry just the polyester and to introduce the masterbatch without drying.

Next, the granules are introduced into injection-blow molding processes for manufacturing hollow containers such as bottles. These processes, described in numerous publications and used widescale in industry, comprise a first step of injection molding in order to manufacture preforms. In a second step, the preforms, which may or may not be cooled, are reheated in order to be blow-molded into the form of the desired bottles, optionally with biaxial stretching.

The preforms are obtained, for example, by melting the resin in a single-screw or double-screw injection molding press, which also allows the polyester to be plasticized and fed under pressure into a distributor provided with heated nozzles and obturators, for example heated to a temperature of from 260° C. to 285° C.

The composition is injected into at least one mould for the preform, then cooled in order to obtain a solid preform. The mould is provided with suitable cooling means in order to control the cooling rate of the preform and thus avoid spherulitic crystallization, which might be a problem in the blow molding step. Rapid cooling is also necessary in order to obtain short injection molding cycle times and therefore high production rates.

After the preform has solidified, it is ejected and either cooled down to room temperature, in order to be stored and blow-molded consequently, or maintained at an intermediate temperature and introduced directly, without further cooling, into a blow molding installation as described below.

In this preform manufacturing process, the polyester is melted at a temperature of around 280° C., for example from 270° C. to 285° C., and then injected into moulds. Advantageously, the lowest possible injection temperature will be used in order to limit the formation of acetaldehyde, especially to reduce the rate of acetaldehyde formation.

Furthermore, it is advantageous for the moulds to be cooled to a temperature of from 0° C. to 10° C. Such cooling is obtained by using any suitable coolant, such as for example glycol water.

Advantageously, the injection-molding/cooling cycle time is from about 10 seconds to 1 minute.

The polyester forming the wall of the preform obtained using this process has a viscosity index of from 0.45 dl/g to 1.2 dl/g, advantageously from 0.60 dl/g to 1 dl/g.

The preforms thus obtained are generally used in blow molding processes to manufacture bottles. These blow-molding processes are also widely used and described in numerous publications.

They generally entail introducing the preform into a blow molding installation that includes heating means, with or without overstretching.

The preform is heated to at least above the $T_g$ (glass transition temperature) of the polymer and then pre-blow molded by injecting a pressurized gas at a first pressure for a first period. A second injection of a gas at a second pressure allows the final shape of the bottle to be obtained before its injection molding, after cooling.

Advantageously, the preform heating temperature is from 80° C. to 105° C. This heating is carried out by any suitable means, for example by infrared radiation directed onto the outer surface of the preform. This heating is advantageously controlled so as to avoid obtaining too large a temperature difference from the inside and the outside of the preform.

Advantageously, the preblowing of the preform takes place at a first pressure of from $4\times10^5$ Pa and $10\times10^5$ Pa (4 bar and 10 bar) for a time of from 0.15 to 0.6 seconds.

The second blowing step is carried out at a second pressure of from $3\times10^6$ Pa and $4\times10^6$ Pa (30 and 40 bar) for a second time of from 0.3 to 2 seconds.

A stretching rod may also be introduced, in a known manner, into the preform during the preblowing and/or blowing operations in order to partly stretch the preform.

The bottles thus obtained are produced with walls formed by a single layer of material. They have an attractive white appearance compatible with the storage of food products such as milk. Other colors may be obtained, by combining with the fillers of the invention colored pigments that can be added into the polymerization mixture or mixed into the PET granules before being melted for the injection molding. As illustrated above, they may be obtained using conventional processes for manufacturing hollow bodies by injection-blow molding.

In addition, these bottles may have mechanical properties that allow them to be used in hot filling processes and processes that include a sterilization or pasteurization step. These mechanical properties are also suitable for storing the bottles in a stacked manner, whatever the ambient storage temperature.

The bottles thus obtained have a very low normal light transmission. Thus, after UHT milk has been stored for 3 months, the taste of the milk as judged by a panel of tasters was not impaired.

The invention also makes it possible to produce bottles of different volumes and of various shapes, as is already the case for the translucent polyester bottles that are used for storing food products, such as water.

In order to further illustrate the present invention and the advantages thereof, the following specific examples are given, it being understood that same are intended only as illustrative and in nowise limitative. In said examples to follow, all parts and percentages are given by weight, unless otherwise indicated.

EXAMPLE 1

The syntheses were carried out in a batch installation consisting of two successive stainless steel reactors, each of 200 liter volume.

The first reactor, equipped with a screw/shaft stirring system and with a column allowing the glycol and water formed to be separated, was used to carry out the esterification step under pressure. The second reactor, equipped with a screw/shaft stirring system, was used to carry out the polycondensation step, under a gradual vacuum.

In this example, the mineral filler used was a rutile titanium dioxide marketed under the reference 2220 by Kronos. The weight concentration in the composition obtained was 4%.

The synthesized polyethylene terephthalate contained 2.3 mol % of isophthalic units, that is to say the acid monomers used were a mixture of terephthalic acid (TPA) and isophthalic acid (IPA), the mixture containing 2.3 mol % IPA.

The ratio of the number of moles of ethylene glycol (EG) to the total number of moles of diacids is 1.20.

The catalyst used for the polycondensation was antimony oxide and its concentration by weight, expressed as Sb, was 250 ppm relative to the weight of polymer theoretically obtained from the mass of monomers involved.

Raw materials used:
terephthalic acid (TPA): 103.796 kg (624.99 moles)
isophthalic acid (IPA): 2.444 kg (14.71 moles)
ethylene glycol (EG): 47.616 kg (768 moles)
rutile $TiO_2$ (2220 from Kronos): 5.340 kg
$Sb_2O_3$: 36.8 g
Preparation of the mineral filler:

35 kg of glycol (part of the 47.616 kg indicated above) were introduced, at room temperature, into a stainless steel container and then the 5.340 kg of titanium oxide were gradually added, with vigorous stirring, for example ultrasonic stirring.

The stirring was maintained for 15 minutes after the end of introducing the $TiO_2$.

The glycolic titanium oxide suspension was transferred into the esterification reactor containing the remainder of the glycol (12.616 kg). The terephthalic acid/isophthalic acid mixture was added with stirring. After purging the reactor with nitrogen and then pressurizing it under an absolute nitrogen pressure of 6.6 bar, the temperature of the reaction mass was gradually raised from 25° C. to 260° C. over 60 minutes, from 260° C. to 270° C. over 10 minutes and finally from 270° C. to 285 °C. over 40 minutes.

The esterification reaction started when the temperature of the reaction mass reached about 240° C.

The degree of reflux of the distilled water was set so that the temperature at the top of the column remained at 167-168° C. throughout this esterification step.

When the distillation of the water was complete, the pressure in the reactor was brought back down to atmospheric pressure.

The antimony oxide was then introduced into the reaction mass.

This mass was transferred to the second, polycondensation reactor, which had been inerted beforehand with nitrogen and heated to 280° C.

The pressure in the reactor was progressively lowered to 1 mbar, with stirring. At the same time, the temperature of the reaction mass was raised to 285° C.

The pressure was then maintained from about 1 to 0.5 mbar.

The polycondensation was monitored by measuring the stirring torque.

The speed of this stirring was gradually reduced as the viscosity of the reaction mass increased.

The total duration of the polycondensation under a pressure of less than 1 mbar was 190 minutes.

At the end of polycondensation, the stirring torque reached 81.6 mN.

The polymer obtained was extruded through a die in order to produce a rod that was cut up into granules.

EXAMPLE 2

Example 1 was repeated, but with twice the mass of the 2220 rutile $TiO_2$ in order to obtain a weight concentration of 8% in the composition.

The total duration of the polycondensation under a pressure of less than 1 mbar was 180 minutes.

At the end of polycondensation, the stirring torque reached 83.8 mN.

The polymer obtained was granulated under the conditions indicated in Example 1.

EXAMPLE 3

Example 1 was repeated, but with the rutile $TiO_2$ replaced with anatase-type $TiO_2$ marketed by Sachtleben under the trademark HOMBITAN LO CR S M, with the same weight content of 4%.

The synthesis conditions were identical to those of the previous examples.

The total duration of the polycondensation under a pressure of less than 1 mbar was 175 minutes.

At the end of polycondensation, the stirring torque reached 92.5 mN.

The polymer obtained was granulated as in Example 1.

EXAMPLE 4

Example 3 was repeated, but with twice the mass of HOMBITAN LO CR S M $TiO_2$ from Sachtleben in order to obtain a $TiO_2$ concentration of 8% by weight in the composition.

The synthesis conditions were identical to those of the previous examples.

The total duration of the polycondensation under a pressure of less than 1 mbar was 140 minutes.

At the end of polycondensation, the stirring torque reached 97 mN. The polymer obtained was granulated as in Example 1.

The characteristics of the polymers obtained are reported in Table I.

TABLE I

| | Example | | | |
|---|---|---|---|---|
| | 1 | 2 | 3 | 4 |
| $TiO_2$ filler | 4% rutile | 8% rutile | 4% anatase | 8% anatase |
| Viscosity index | 81.6 ml/g | 75.6 ml/g | 90.0 ml/g | 84.4 ml/g |
| Coloration L* | 88.5 | 90.3 | 81.7 | 81.0 |
| a* | 0.0 | 0.3 | −1.2 | −1.1 |
| B* | 5.8 | 5.9 | 4.4 | 3.7 |

The coloration was determined by measurement using a MINOLTA CR310 calorimeter according to the CIE L*a*b* standard.

Before conversion, the polymer granules crystallized, by being stored under vacuum for 16 h at 130° C.

To check the level of opacification of the various polymers synthesized, films were produced by hot-pressing the granules, the thickness of the films obtained and characterized being of the same order of magnitude as that of the wall of generally injection-molded/blow-molded bottles.

The residual UV/visible transmission results obtained are reported in Table II.

TABLE II

| $TiO_2$ filler | | 1<br>4%<br>rutile | 2<br>8%<br>rutile | 3<br>4%<br>anatase | 4<br>8%<br>anatase | Control<br>PET, no<br>filler |
|---|---|---|---|---|---|---|
| Film thickness | | 310 μm | 330 μm | 340 μm | 340 μm | 320 μm |
| Cut-off threshold (*) | | 409 nm | 434 nm | 407 nm | 473 nm | 315 nm |
| Normal | 300 nm | <0.01 | <0.01 | <0.01 | <0.01 | <0.01 |
| transmission | 400 nm | <0.01 | <0.01 | <0.01 | <0.01 | 33 |
| factor | 500 nm | 0.09 | 0.04 | 0.07 | 0.02 | 40 |
| (%) at λ = | 600 nm | 0.12 | 0.06 | 0.12 | 0.05 | 44.5 |

(*) wavelength (λ) below which no residual transmission can be detected, i.e., less than 0.01%.

The UV/visible residual transmission values of the films obtained were measured on a Perkin Elmer Lambda 9 spectrophotometer.

These tests clearly show the very low or even zero level of normal transmission of the films obtained with the compositions of the invention.

These results are representative of those obtained with the walls of a bottle produced with a composition according to the above examples.

In addition, bottles of 0.5 liter volume were produced with the compositions of Examples 2 and 4. These bottles were filled with milk according to the UHT method and preserved for 3 months under an illumination of 300 lux, representative of illumination in stores. The stored milk was tested according to the conventional procedure for taste evaluation. The milk had an unimpaired taste, that is to say no "light-affected taste".

EXAMPLE 5

The synthesis of the composition according to the invention was carried out in a stainless steel batch reactor of 7.5 l volume.

This reactor was equipped with:
a double helical ribbon stirring system fitted with a torque meter allowing the polycondensation step to be monitored, by evaluating the viscosity of the reaction mass;
a column for separating the water from the glycol, during the esterification step.

This reactor operated under pressure during the esterification step, and under reduced pressure during the polycondensation step.

The mineral filler used was HOMBITAN LC-S anatase titanium oxide marketed by Sachtleben. The weight concentration of titanium oxide in the composition obtained was 8%.

The amount of isophthalic units and the ethylene glycol/total number of diacid moles molar ratio were the same as in the case of Examples 1 to 4, as was the amount of antimony oxide employed.

Raw materials used:
terephthalic acid (TPA): 2595 g (15.632 mole)
isophthalic acid (IPA): 61.1 g (0.368 mole)
ethylene glycol (EG): 1190 g (19.2 mole)
anatase $TiO_2$ (HOMBITAN LC-S): 268 g
$Sb_2O_3$: 0.938 g A suspension of the mineral filler was prepared by introducing, into a 2-liter beaker, 900 g of glycol, at room temperature, and at stirring in 268 g of $TiO_2$ in a homogenizer of the Ultra-Turrax type. The mixing was maintained with stirring for 3 minutes.

The $TiO_2$ glycol suspension was then introduced into the esterification reactor together with the remainder of the ethylene glycol.

After purging the reactor with nitrogen, the nitrogen pressure was raised to 6.6 bar absolute.

The temperature was raised from 25° C. to 260 °C. over 50 minutes, maintained at 260° C. for 30 minutes and finally gradually raised to 280° C., over 50 minutes.

The esterification reaction started when the temperature of the reaction mass reached about 250° C.

The degree of reflux in the column was set so as to maintain a temperature at the top of the column of 161-162° C.

After the distillation of the water coming from the esterification was complete, the pressure in the reactor was brought back down to atmospheric pressure.

The antimony oxide, dissolved beforehand at 160° C. in 30 ml of glycol, was then introduced hot into the reaction mixture.

The pressure in the reactor was progressively lowered to 0.7 mbar, over 80 minutes.

At the same time, the temperature was raised to 285° C., over 50 minutes, and then maintained at this temperature.

The polycondensation was monitored by measuring the stirring torque, and it was stopped when this torque reached 2.3 mN.

The polycondensation time was 60 minutes. The polymer obtained was then granulated once extruded in the form of a rod into a water bath and the rod cut up in a granulator.

EXAMPLE 6

Example 5 was repeated, but with the HOMBITAN LC-S anatase titanium oxide replaced with 1075 anatase titanium oxide marketed by Kronos, with the same 8% weight content in the final composition. The synthesis conditions were identical to those of Example 5. The polycondensation time was 53 minutes. The polymer was granulated under the same conditions as in Example 5.

EXAMPLE 7

Example 5 was repeated, but with the HOMBITAN LC-S anatase titanium oxide replaced with 1014 anatase titanium oxide marketed by Kronos, with the same 8% weight content.

The synthesis conditions were identical to those of Examples 5 and 6. The polycondensation time was 72 minutes. The polymer was granulated under the same conditions as in Example 5.

EXAMPLE 8

Example 5 was repeated, but with the HOMBITAN LC-S anatase titanium oxide replaced with A-HRF anatase titanium oxide marketed by Huntsman, with the same 8% weight content.

The synthesis conditions were identical to those of Examples 5 to 7. The polycondensation time was 80 minutes. The polymer was granulated under the same conditions as in Example 5.

EXAMPLE 9

Example 5 was repeated, but with the HOMBITAN LC-S anatase titanium oxide replaced with A-PP2 anatase titanium oxide marketed by Huntsman, with the same 8% weight content.

The synthesis conditions were identical to those of Examples 5 to 8. The polycondensation time was 55 minutes. The polymer was granulated under the same conditions as in Example 5.

The characteristics of the polymers obtained are reported in Table III.

TABLE III

|  |  | Example | | | | |
|---|---|---|---|---|---|---|
|  |  | 5 | 6 | 7 | 8 | 9 |
| Weight concentration of titanium oxide (*) | | 7.5% | 7.8% | 7.8% | 8.0% | 7.7% |
| Viscosity index | | 66.7 ml/g | 67.7 ml/g | 70.4 ml/g | 73.0 ml/g | 66.7 ml/g |
| Color- | $L^*$ | 80.1 | 84.6 | 83.8 | 82.5 | 84.3 |
| ation | $a^*$ | 1.5 | 1.8 | 2.3 | 1.2 | 1.5 |
|  | $b^*$ | 7.4 | 7.4 | 8.6 | 7.3 | 7.0 |

(*) This concentration was determined by measuring the ash content, by pyrolysis of the composition at 800-850° C.

The residual UV/visible normal transmission results obtained, determined using the method described for Examples 1 to 4, are reported in Table IV.

TABLE IV

|  |  | Example | | | | |
|---|---|---|---|---|---|---|
|  |  | 5 | 6 | 7 | 8 | 9 |
| Weight concentration of titanium oxide (*) | | 7.5% | 7.8% | 7.8% | 8.0% | 7.7% |
| Film thickness | | 300 μm | 300 μm | 310 μm | 320 μm | 300 μm |
| Cut-off threshold | | 500 nm | 410 nm | 480 nm | 490 nm | 490 nm |
| Normal transmission factor (%) at $\lambda =$ | 400 nm | <0.01 | <0.01 | <0.01 | <0.01 | <0.01 |
|  | 500 nm | 0.02 | 0.04 | 0.02 | 0.02 | 0.02 |
|  | 600 nm | 0.05 | 0.09 | 0.06 | 0.055 | 0.055 |
|  | 700 nm | 0.09 | 0.13 | 0.10 | 0.095 | 0.095 |

EXAMPLE 10

This example describes the production of preforms and bottles, using a composition according to the invention obtained by mixing a PET-based masterbatch, containing 60% HOMBITAN LO-CR-SM anatase titanium oxide (from Sachtleben), with a PET polymer containing 2.1 mol % of isophthalic units, the viscosity index of the composition being 83 ml/g. The mixing weight ratio was 13.3% masterbatch to 86.7% polyester. The masterbatch granules and the polyester resin granules were uniformly mixed beforehand.

The preforms were manufactured using a HUSKY LX 160T injection-molding machine, comprising a double-impression mould with a 42 mm diameter screw.

The preforms obtained had a 28 mm neck and the cycle time was 14.4 s.

The injection molding conditions were the following:
temperature profile of the melting zones in the barrel containing the screw: 270° C.-275° C.-275° C.-275° C.-275° C.-275° C. -275° C.-275° C.-275° C.-275° C.;
screw speed: 44% of the maximum speed permitted by the machine;
temperature profile of the injection molding cylinder: 270° C.-270° C. -270° C.;
injection time: 2.45 s;
injection pressure: 34 bar;
cooling water temperature: inlet: 4.2° C.
outlet: 4.8° C.

The preforms obtained with a composition containing 8% $TiO_2$ by weight had a weight of 27.7 g.

The preforms were blow molded in a SIDEL SBO 1 injection molding press equipped with a 500 ml bottle mould and two ovens equipped with successive infrared lamps in order to heat the preform according to a defined heating profile. In the tests below, the first oven was not used and the lamp settings of the second oven are indicated in Table V below. The blow molding conditions employed are indicated in Table V:

TABLE V

|  |  | Rate (bottles/h) 1000 |
|---|---|---|
| Lamp power (second oven) (%) | 10 | 0 |
|  | 9 | 0 |
|  | 8 | 0 |
|  | 7 | 0 |
|  | 6 | 64 |
|  | 5 | 60 |
|  | 4 | 50 |
|  | 3 | 40 |
|  | 2 | 29 |
|  | 1 | 30 |
| Surface temperature of the preforms | | 101° C. |
| Pressure | Preblowing | 9 bar |
|  | Blowing | 35 bar |
| Duration | Preblowing | 0.12 s |
|  | Blowing | 1.45 s |
|  | Degassing | 0.50 s |
| Total cycle time | | 2.07 s |

The thickness of the body of the bottles obtained was about 350 μm.

The residual UV/visible normal transmission values for the bottles obtained were thickness:
wall thickness: 345 μm
cut-off threshold: 440 nm
residual normal transmission
$\lambda=400$ nm: <0.01%
$\lambda=500$ nm: 0.015%
$\lambda=600$ nm: 0.03%
$\lambda=700$ nm: 0.045%

Each patent, patent application, publication, text and literature article/report cited or indicated herein is hereby expressly incorporated by reference.

While the invention has been described in terms of various specific and preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the manufacture of a packaging/storage shaped article formed from a single layer of material, comprising providing a precursor composition which comprises a polyester or polylactone thermoplastic matrix having one opacifying white mineral filler distributed therethrough, said mineral filler being selected from titanium oxides and zinc sulfide and comprising from 4% to 40% by weight of said composition and thence converting said composition into said packaging/storage shaped article, said single layer shaped article having a normal light transmission, in the wavelength range from 350 nm to 550 nm, of less than 0.25% and a wall thickness of single layer from 0.2 mm to 0.6 mm.

2. The process as defined by claim 1, said mineral filler comprising rutile and/or anatase titanium dioxide.

3. The process as defined by claim 2, said mineral filler comprising particles of titanium dioxide coated with one or more protective layers.

4. The process as defined by claim 1, the thermoplastic matrix comprising polyethylene terephthalate or polyethylene naphthalate and also comprising at least 92.5% by number of ethylene terephthalate or ethylene naphthalate recurring structural units.

5. The process as defined by claim 1, said precursor composition being formulated by molding a polyester resin with a masterbatch comprising at least 30% by weight of said white mineral filler.

6. The process as defined by claim 5, said masterbatch comprising a polyester resin matrix.

7. The process as defined by claim 1, comprising converting said composition into a packaging/storage film, molded part, extruded profile or hollow bottle.

8. The process as defined by claim 7, comprising converting said composition by injection molding, extrusion, pultrusion or injection-blow molding.

9. The process as defined by claim 7, comprising converting said composition into a hollow-bottle by injection-blow molding.

10. The process as defined by claim 1, said polyester or polylactone thermoplastic matrix comprising a polymer crystallization retardant.

11. The process as defined by claim 1, said precursor composition comprising recycled packaging/storage shaped article.

12. The process as defined by claim 1, said mineral filler comprising 4 to 20% by weight of said precursor composition.

13. The process as defined by claim 1, said shaped article having a normal light transmission of less than 0.1%.

14. A packaging/storage shaped article formed from a single layer of a precursor composition which comprises a polyester or polylactone thermoplastic matrix having one opacifying white mineral filler distributed therethrough, said mineral filler being selected from titanium oxides and zinc sulfide and comprising from 4% to 40% by weight of said composition, said single layer shaped article having a normal light transmission, in the wavelength range from 350 nm to 550 nm, of less than 0.25% and a wall thickness of the single layer from 0.2 mm to 0.6 mm.

15. The shaped article as defined by claim 14, having a normal light transmission of less than 0.1%.

16. The shaped article as defined by claim 14, comprising a hollow bottle obtained by injection molding.

17. The shaped article as defined by claim 14, comprising a film, molded part or extruded profile.

18. An packaging/storage shaped article as defined by claim 14, confining a food, beverage or dairy product.

19. The shaped article as defined by claim 14, said mineral filler comprising rutile and/or anatase titanium dioxide.

20. The shaped article as defined by claim 19, said mineral filler comprising particles of titanium oxide coated with one or more protective layers.

21. The shaped article as defined by claim 14, the thermoplastic matrix comprising polyethylene terephthalate or polyethylene naphthalate and also comprising at least 92.5% by number of ethylene terephthalate or ethylene naphthalate recurring structural units.

22. The shaped article as defined by claim 14, said mineral filler comprising 4 to 20% by weight of said precursor composition.

* * * * *

UNITED STATES PATENT AND TRADEMARK OFFICE
CERTIFICATE OF CORRECTION

| | |
|---|---|
| PATENT NO. | : 7,544,405 B2 |
| APPLICATION NO. | : 11/580885 |
| DATED | : June 9, 2009 |
| INVENTOR(S) | : Jean-Luc Lepage |

Page 1 of 1

It is certified that error appears in the above-identified patent and that said Letters Patent is hereby corrected as shown below:

Title Page, item 30 (Foreign Application Priority Data): add --April 15, 2004 (FR) 04/03928--.

Signed and Sealed this

Twenty-eighth Day of July, 2009

JOHN DOLL
*Acting Director of the United States Patent and Trademark Office*